United States Patent Office 2,986,578
Patented May 30, 1961

2,986,578
PROCESS FOR CONVERTING ERYTHROFORM OF β-HYDROXY-α-AMINO ACID TO THREO-FORM THEREOF

Takeo Kaneko and Toshishige Inui, Osaka, Japan, assignors to Ajinomto Co., Inc., Tokyo, Japan
No Drawing. Filed Mar. 18, 1959, Ser. No. 800,110
Claims priority, application Japan Mar. 24, 1958
3 Claims. (Cl. 260—519)

This invention relates to a process for preparing a threo β-hydroxy-α-amino acid.

The present invention concerns a new process wherein erythro-isomers of a β-hydroxy-α-amino acid are converted to their corresponding oxazolidone ester of cis-form which has never been known, the latter is hydrolyzed and simultaneously converted to trans-oxazolidone carboxylic acid by treating it with an alcoholic solution of potassium hydroxide and then threo-β-hydroxy-α-amino acid is obtained by hydrolyzing said oxazolidone carboxylic acid. The main object of this invention is to convert erythro-isomers of racemic or optically active β-hydroxy-α-amino acids to threo-isomers by an industrially operable and inexpensive process.

When a β-hydroxy-α-amino acid having two asymmetric carbon atoms in vicinal position is synthesized according to conventional methods, a mixture of two theoretically anticipated racemic modifications (erythro-form and threo-form) is usually produced. The ratio of diastereoisomers to be produced depends upon the characteristics due to the steric effect and electronic effect in the respective reactions. However, the erythro-form, which has more stable steric conformation than the threo modification, is preferentially produced in most cases. Their separation from each other is conventionally carried out by differences between the solubilities of them in a state of free amino acid, salt or other derivatives. Natural threonine, an important member of the indispensable amino acids, is L-threonine which belongs to threo-form among the four stereoisomers. In order to synthesize economically such important β-hydroxy-α-amino acid, it is desirable to convert the erythro-form, i.e. the non-natural form, completely to the threo-form according to a simple and inexpensive process.

Heretofore known methods for such conversion of configuration with regard to β-hydroxy-α-amino acid are roughly classified into three kinds. According to the first method, erythro-N-acyl-β-hydroxy-α-amino acid ester is treated with thionyl chloride and thus obtained oxazoline derivatives of trans-form are hydrolized with hydrochloric acid to produce threo-β-hydroxy-α-amino acid. According to the second method, erythro-N-acyl-O-tosyl derivative is treated with potassium acetate and then hydrolized to threo-β-hydroxy-α-amino acid. In these reactions, the carbonyl oxygen atom in acyl radical attacks the β-carbon atom and thus the steric configuration at the β-carbon atom is reversed. According to the third method, erythro-β-hydroxy-α-amino acid ester is treated with benzimino ethyl ether and the thus formed corresponding cis-oxazoline derivative is hydrolized with an alcoholic aqueous solution of sodium hydroxide and the steric configuration of the α-carbon atom is reversed to form a stable transoxazoline derivative which is finally hydrolyzed with acid to obtain the threo-β-hydroxy-α-amino acid.

Oxazolidone derivatives having a carboxyl radical or its ester radical at 4-position can be easily obtained, if a β-hydroxy-α-amino acid or its ester is subjected to a reaction with phosgene in the presence of an aqueous solution of alkali hydroxide or alkali carbonate. Although a few oxazolidone derivatives of an aliphatic or cyclic amino-alcohol have been heretofore known, an oxazolidone derivative corresponding to a β-hydroxy-α-amino acid has never been found. We have found that an erythro-β-hydroxy-α-amino acid or its ester may be changed into cis-oxazolidone derivatives with retention of their configuration and threo-β-hydroxy-α-amino acid or its ester may be similarly changed into trans-oxazolidone derivatives, and that the thus obtained cis and trans oxazolidone derivatives can be hydrolized to the β-hydroxy-α-amino acid with its original configuration without an accompanying reversion of the steric structure, if they are heated with hydrochloric acid. Furthermore, if an oxazolidone carboxylic acid of cis- or trans-form is subjected to a reaction with diazo-alkyl or alcoholic or anhydrous hydrogen chloride, corresponding oxazolidone esters may be produced.

The possibility of converting erythro-β-hydroxy-α-amino acid to its threo-form depends upon whether cis-oxazolidone derivatives may be converted to their trans-form by the action of alkali. We have researched precisely these points and found the following results.

When cis-oxazolidone carboxylic ester derived from erythro β-hydroxy-α-amino acid is heated for a short time with an alcoholic aqueous solution of an equivalent amount of sodium hydroxide, hydrolysis of the ester takes place but no reversion, while if the same is heated for a short time with a solution of an equivalent amount of potassium hydroxide in 99% alcohol, both the hydrolysis of the ester and the reversion takes place.

In the latter reaction, trans-oxazolidone carboxylic acid yielded to about 79% and the free carboxylic acid of the cis- compound receives no action under the same condition. On the other hand, even if trans-oxazolidone-carboxylic ester derived from threo-β-hydroxy-α-amino acid is heated for a short time with an alcoholic solution of equivalent amount of potassium hydroxide, hydrolysis merely takes place and its steric configuration is maintained as it is. Thus it has now been found that the cis-form of oxazolidone carboxylic ester can be converted to trans-form of oxazolidone carboxylic acid under the above-described conditions but the trans-form of oxazolidone carboxylic ester is not converted to cis-form of oxazolidone carboxylic acid under the same conditions. Because the conversion does not take place when the compound is cis-oxazolidone carboxylic acid but takes place merely in the case of cis-oxazolidone carboxylic ester, it should be regarded as the configurational stabilization of the α-carbon atom in the oxazolidone ring.

The paths of conversion in the above-described reactions are illustrated in the following scheme, threonine being taken as an example.

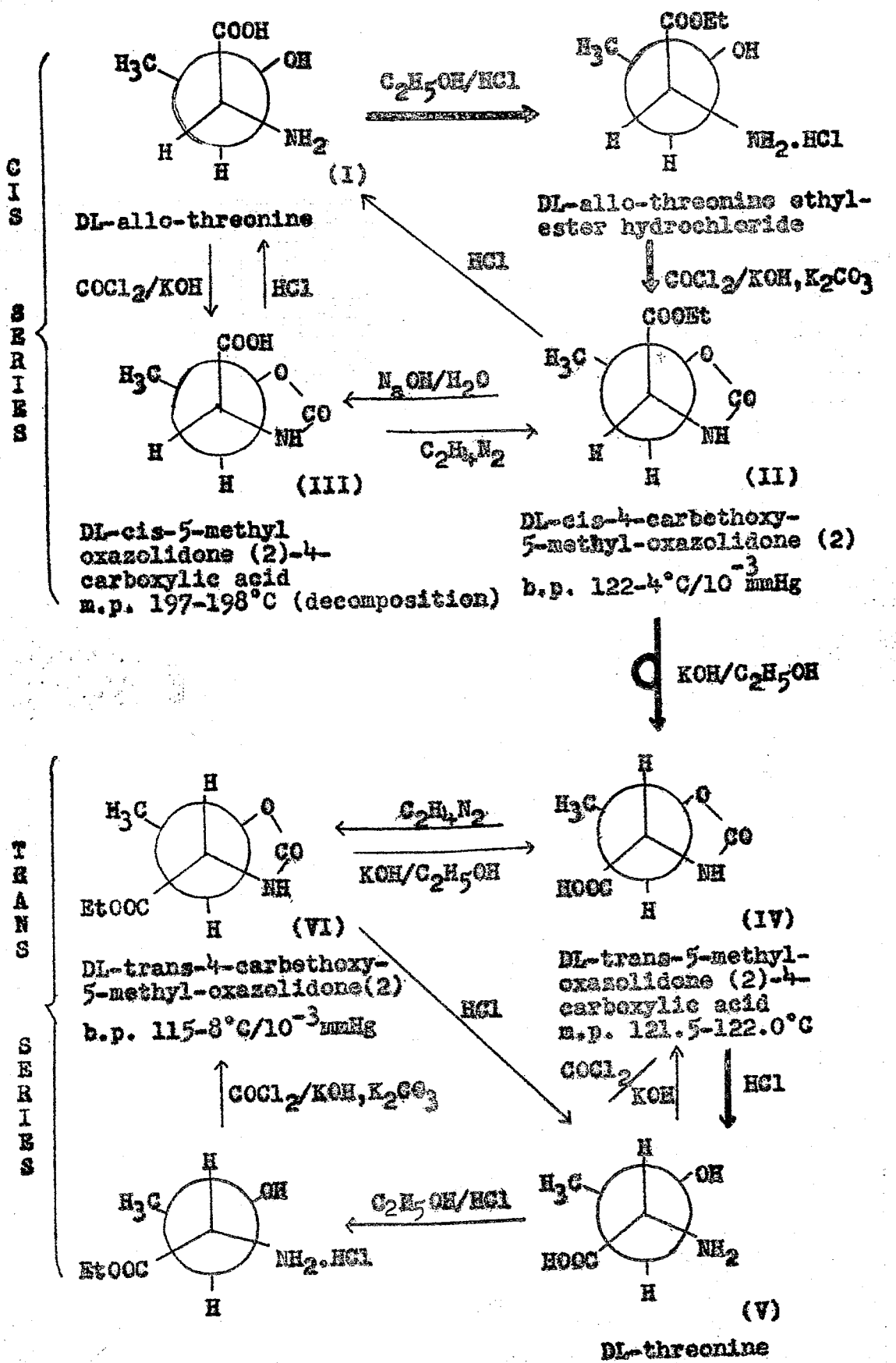

We have succeeded in converting erythro-β-hydroxy-α-amino acid such as DL-allo-threonine (I) to threo-β-hydroxy-α-amino acid such as DL-threonine (V) by means of comparatively cheap chemicals, such as phosgene, which are available as industrial raw materials, as easily understood from the above scheme.

The following examples illustrate the present invention but are not to be construed as limiting the same.

EXAMPLE 1 (CONVERSION FROM DL-ALLO-THREONINE TO DL-THREONINE)

*Preparation of DL-cis-4-carbethoxy-5-methyl-oxazolidone (2) (II) from DL-allo-threonine (I).*—(a) DL-allo-threonine (I) (7.2 gr., 0.060 mole) was added to 120 ml. of absolute alcohol and was esterified by passing dry hydrogen chloride gas through it. After standing still overnight, the solution was condensed under reduced pressure and dried. DL-allo-threonine ethyl-ester hydrochloride was solidified. The yield was theoretical. It was dissolved in 200 ml. of water and 105 ml. of toluene was added to cover the upper surface of it and then cooled to 3° C. An aqueous solution of potassium hydroxide (70 ml., 0.070 mole) and 26 g. (0.188 mole) of anhydrous potassium carbonate added to it. A solution of 14.6 g. of phosgene (0.147 mole) in 45 ml. of toluene was added dropwise during about 40 min. under agitation. Further mechanical agitation was continued for 1 hour at 0° C. The toluene phase was separated from the aqueous phase and washed twice with 50 ml. of an aqueous solution of hydrochloric acid (1:10). The separated aqueous phase was extracted once with toluene and added to the hydrochloric acid washings. The aqueous solution indicated Congo red acidic. The aqueous solution was extracted four times with 60 ml. of ethyl acetate, dried with Glauber salt and concentrated to leave a colourless liquid (5.2 gr., ca. 50%) of DL-cis-4-carbethoxy-5-methyl-oxazolidone (2) (II). It was subjected to distillation under highly reduced pressure. The obtained compound showed a boiling point of 122–4° C./$10^{-3}$ mm. Hg and $n_D^{20}$ 1.46420.

Elementary analysis:

|  | C, percent | H, percent | N, percent |
|---|---|---|---|
| Found | 48.41 | 6.39 | 7.87 |
| Calculated for $C_7H_{11}O_4N$ | 48.55 | 6.40 | 8.09 |

Infra-red absorption spectrum:

Absorption of NH at 3280 cm.$^{-1}$ and 3120$^{-1}$
Absorption of CO of oxazolidone and ester strongly at 1760 cm.$^{-1}$
Absorption of oxazolidone ring at 1100 cm.$^{-1}$, 1050 cm.$^{-1}$ and 1020 cm.$^{-1}$ After the extraction of cis-ester with ethyl acetate, the aqueous phase was concentrated, and it was extracted with ethyl acetate while hot. Approximately 2 g. of DL-cis-5-methyl oxazolidone (2)-4-carboxylic acid (III) was obtained. Melting point 193–5° C. (decomposition) (sintered at 187° C.).

(b) DL-allo-threonine (3.4 gr., 0.0286 mole) and 13.0 g. (0.232 mole) of potassium hydroxide were dissolved in 110 ml. of water and cooled to and kept at 3° C. A solution of 6.3 g. (0.0637 mole) of phosgene in 20 ml. of toluene was added to it dropwise requiring 25 minutes under agitation. Agitation was further continued for one hour at 0° C. The toluene phase was separated and extracted with ether. The aqueous phase was made Congo red acidic with hydrochloric acid and then concentrated to dryness. The dried residue was extracted five times with 50 ml. of ethyl acetate while hot. The extraction was concentrated. The first crystallized DL-cis-5-methyl-oxazolidone (2)-4-carboxylic acid (III) was filtered. The filtrate was again concentrated and the second crop of crystallized cis-acid (III) was filtered. The concentration and separation were repeated up to about 1/15 quantity. The yield was 2.9 g. (70%). The melting point after recrystallization from ethyl acetate and petroleum benzine was 197–8° C. (decomposition).

Elementary analysis:

|  | C, percent | H, percent | N, percent |
|---|---|---|---|
| Found | 41.20 | 4.71 | 9.69 |
| Calculated for $C_5H_7O_4N$ | 41.38 | 4.86 | 9.65 |

Infra-red absorption spectrum:

Absorption of NH at 3400 cm.$^{-1}$
Absorption of CO of oxazolidone (2) at 1741 cm.$^{-1}$
Absorption of oxazolidone ring at 1090 cm.$^{-1}$ and 1038 cm.$^{-1}$
Absorption of CO of COOH at 1712 cm.$^{-1}$
Specific absorption at 860 cm.$^{-1}$ The above DL-cis-5-methyl-oxazolidone (2)-4-carboxylic acid (III) (3.6 gr., 0.0248 mole) was added to 80 ml. of ether and then an etherial solution of diazoethane was added to it, when reaction took place, evolving nitrogen gas, and said cis-acid (III) dissolved. After standing overnight and evaporation of the solvent, 2.7 g. of a liquid having the boiling point 138–140° C./0.005 mm. Hg was obtained. Its infra-red absorption spectrum coincided with the product according to the afore-mentioned method (a).

*Conversion of DL-cis-4-carbethoxy-5-methyl-oxazolidone (2) (II) to DL-trans-5-methyl-oxazolidone (2)-4-carboxylic acid (IV).*—(a) DL-cis-4-carbethoxy-5-methyl-oxazolidone (2) (II) (3.72 gr., 0.0215 mole) was dissolved in 27.0 ml. (0.0216 mole) of a 0.80 N alcoholic solution of potassium hydroxide and 26.8 ml. of 99% alcohol. The solution was heated under reflux for 20 minutes. The solvent was distilled off under a reduced pressure and the residue was dissolved in a small quantity of water. The aqueous solution was extracted twice with ethyl acetate, made Congo red acidic with hydrochloric acid and concentrated to dryness. The residue was extracted four times with 40 cc. of ethyl acetate while hot. The extraction was concentrated and the resulting oil was rubbed when crystallization began. The crystals were separated and washed with a small quantity of ethyl acetate. The yield was 2.46 g. (79%). Its melting point was 117.5–120.5° C. and became 121.5–122.0° C. when recrystallized from ethyl acetate (23 ml.) and petroleum benzine (5 ml.).

Elementary analysis:

|  | C, percent | H, percent | N, percent |
|---|---|---|---|
| Found | 41.55 | 5.01 | 9.85 |
| Calculated for $C_5H_7O_4N$ | 41.38 | 4.86 | 9.65 |

Infra-red absorption spectrum:

Absorption of NH at 3340 cm.$^{-1}$
Absorption of CO of oxazolidone (2) at 1752 cm.$^{-1}$
Absorption of oxazolidone ring at 1090 cm.$^{-1}$ and 1061 cm.$^{-1}$
Absorption of CO of COOH at 1718 cm.$^{-1}$
Specific absorption at 895 cm.$^{-1}$.

No depression was noted on admixture with pure authentic DL-trans-5-methyl-oxazolidone (2)-4-carboxylic acid (MP. 127–128°) obtained from DL-threonine, and all properties of both compounds were identical.

Crude DL-4-carbethoxy-5-methyl oxazolidone (2) (1.84 g., 0.0106 mole) (a mixture of DL-cis-4-carbethoxy-5-methyl-oxazolidone (2) (II) and DL-trans-4-carbethoxy-5-methyl-oxazolidone (2) (VI)) obtained from a mixture of DL-allo-threonine (I) and DL-threonine (V) was treated with 13.0 ml. (0.0106 mole) of a 0.82 N alcoholic solution of potassium hydroxide and 13.4 ml. of 99% alcohol in the same procedure and 1.19 g. (73%) of DL-trans-5-methyl-oxazolidone (2)-4-carboxylic acid (IV) was obtained.

*DL-threonine (V) from DL-trans-5-methyl-oxazolidone (2)-4-carboxylic acid (IV).*—The above DL-trans-5-methyl-oxazolidone (2)-4-carboxylic acid (IV) (6.06 g., 0.035 mole) was dissolved in 120 ml. of hydrochloric acid (1:1) and heated under reflux for 6 hours. After thorough evaporation of hydrochloric acid, the residue was dried over sulfuric acid-sodium hydroxide under a reduced pressure. It was dissolved in alcohol (170 ml.) and pyridine (ca. 40 ml.) was added when DL-threonine crystallized out. After filtration, the crystals were washed with alcohol-ether. The yield was 3.71 g. (73%) and the melting point 225.5–7° C. (decomposition) but becomes 231–2° C. (decomposition) when recrystallized from water-alcohol.

Elementary analysis:

|  | C, percent | H, percent | N, percent |
|---|---|---|---|
| Found | 40.21 | 7.50 | 11.56 |
| Calculated for $C_4H_9O_3N$ | 40.33 | 7.62 | 11.76 |

Its infra-red absorption spectrum completely coincided with that of pure DL-threonine. Paper chromatograms of both compounds, with upper layer of n-butanol-acetone-concentrated ammonium hydroxide-water (8:1:1:6) as mobile phase, were practically identical.

EXAMPLE 2 (CONVERSION FROM DL-ALLO-PHENYLSERINE TO DL-PHENYLSERINE)

*Preparation of DL-cis-4-carbethoxy-5-phenyloxazolidone (2) from DL-allo-phenylserine.*—DL-allo-phenylserine dioxane addition compound (10.0 g., 0.045 mole) was suspended in absolute alcohol (120 ml.) and esterified with a vigorous stream of dry hydrogen chloride gas for 2 hours. White crystals of DL-allo-phenylserine ethyl ester hydrochloride precipitated were filtered off and dried. The yield was 8.8 g. (80%), M.P. 183–184° (decomposition).

DL-allo-phenylserine ethyl ester hydrochloride (8.0 g., 0.0326 mole) was dissolved in 150 ml. of water and toluene (70 ml.) was added to cover the upper surface of it, and then cooled to 3° C. N-potassium hydroxide aqueous solution (34 ml., 0.034 mole) and 14.1 g. (0.102 mole) of anhydrous potassium carbonate were added to it. A solution of 8.1 g. (0.0818 mole) of phosgene in toluene (25 ml.) was added dropwise during 25 min. under stirring. Further mechanical stirring was continued for 30 min. after addition, and the resulting DL-cis-4-carbethoxy-5-phenyl-oxazolidone (2) was precipitated. The precipitate was filtered off and dried. The yield was 6.9 g. (90%), M.P. 120–122°, unchanged by recrystallization from benzene and petroleum benzine.

Analysis:

|  | C, percent | H, percent | N, percent |
|---|---|---|---|
| Found | 61.34 | 5.60 | 6.01 |
| Calculated for $C_{12}H_{13}O_4N$ | 61.27 | 5.57 | 5.96 |

Infra-red absorption spectrum:
Absorption of NH at 3210 cm.$^{-1}$ and 3110 cm.$^{-1}$
Absorption of CO of oxazolidone (2) and ester at 1756 cm.$^{-1}$
Absorption of oxazolidone (2) ring at 1115 cm.$^{-1}$ and 1002 cm.$^{-1}$.

*Conversion of DL-cis-4-carbethoxy-5-phenyl oxazolidone (2) to DL-trans-5-phenyloxazolidone (2)-4-carboxylic acid.*—DL-cis-4-carbethoxy-5-phenyloxazolidone (2) (1.15 g., 0.0049 mole) was dissolved in 6 ml. of 99% alcohol and a 0.88 N alcoholic solution of potassium hydroxide (5.6 ml., 0.0049 mole) added to it. The solution was heated under reflux for 20 min. The solvent was distilled off under reduced pressure and the residue was dissolved in 20 ml. of water. The aqueous solution was extracted with ethyl acetate, and acidified with hydrochloric acid. Then, DL-trans-5-phenyloxazolidone (2)-4-carboxylic acid precipitated, was filtered off and dried. The yield was 0.70 g. (69%). It melted at 206.5–207° (decomposition), undepressed on admixture with pure authentic DL-trans-5-phenyl-oxazolidone (2)-4-carboxylic acid (M.P. 207–207.5° (decomposition)). All properties of both compounds were identical.

Analysis:

|  | C, percent | H, percent | N, percent |
|---|---|---|---|
| Found | 57.82 | 4.55 | 6.86 |
| Calculated for $C_{10}H_9O_4N$ | 57.97 | 4.38 | 6.76 |

Infra-red absorption spectrum:
Absorption of NH at 3215 cm.$^{-1}$ and 3120 cm.$^{-1}$
Absorption of CO of oxazolidone (2) at 1765 cm.$^{-1}$ and 1755 cm.$^{-1}$
Absorption of CO of COOH at 1729 cm.$^{-1}$
Absorption of oxazolidone (2) ring at 1137 cm.$^{-1}$, 1032 cm.$^{-1}$ and 1019 cm.$^{-1}$.

*DL-phenylserine from DL-trans - 5 - phenyloxazolidone (2)-4-carboxylic acid.*—DL-trans - 5 - phenyloxazolidone (2)-4-carboxylic acid (1.00 g., 0.0048 mole) was dissolved in 20 ml. of N-hydrochloric acid and heated under reflux for 18 hours. After cooling at room temperature, unchanged DL-trans-acid (0.16 g.) filtered off. The aqueous solution was extracted with ethyl acetate, and evaporated to dryness under reduced pressure. The residue was dissolved in 3 ml. of water, and neutralized with small quantity of concentrated ammonium hydroxide. DL-phenylserine precipitated, was filtered off. The yield was 0.42 g. (52% for changed material), M.P. 203–204° C. (decomposition).

Analysis:

|  | C, percent | H, percent | N, percent |
|---|---|---|---|
| Found | 54.62 | 6.51 | 7.15 |
| Calculated for $C_9H_{11}O_3N$ | 54.26 | 6.58 | 7.03 |

The infra-red absorption curves of the obtained and the authentic compound were identical. Paper chromatograms of both compounds, with upper layer of n-butanol-acetone-concentrated ammonium hydroxide-water (8:1:1:6) as mobile phase, gave spots identical in position, shape, and ninhydrin coloration.

In similar ways, other optically active or inactive erythro-β-hydroxy-α-amino acid esters, such as β-hydroxy-glutamic acid and the like, may be converted to threo-form thereof respectively.

The embodiments of the invention in which an exclusive property or privilege is claimed are defined as follows:

1. A process for preparing a threo-β-hydroxy-α-amino acid, comprising the steps of treating an erythro-β-hydroxy-α-amino acid selected from the group consisting of threonine, phenylserine and β-hydroxy-glutamic acid with phosgene in the presence of an alkali selected from the group consisting of potassium hydroxide and potassium carbonate to produce the corresponding cis-5-substituted-oxazolidone (2)-4-carboxylic acid, treating the latter with an esterifying agent selected from the group consisting of diazoethane and alcoholic hydrogen chloride to obtain cis-4-carboalkoxy-5-substituted-oxazolidone (2), heating said cis-oxazolidone (2) derivative with an equivalent amount of potassium hydroxide in alcoholic solution until the corresponding trans-5-substituted-oxazolidone (2)-4-carboxylic acid is formed and hydrolyzing said trans-oxazolidone (2) derivative to form the threo-β-hydroxy-α-amino acid.

2. A process for preparing a threo-β-hydroxy-α-amino acid, comprising the steps of treating an alkyl ester of an erythro-β-hydroxy-α-amino acid selected from the group consisting of threonine, phenylserine and β-hydroxy-glutamic amid with phosgene in the presence of an alkali selected from the group consisting of potassium hydroxide and potassium carbonate to produce the corresponding cis-4-carboalkoxy-5-substituted oxazolidone (2), heating the latter with an equivalent amount of potassium hydroxide in alcoholic solution until the corresponding trans-5-substituted oxazolidone (2)-4-carboxylic acid is formed and hydrolyzing said trans-oxazolidone (2) derivative to form the threo-β-hydroxy-α-amino acid.

3. A process for preparing a threo-β-hydroxy-α-amino acid, comprising the steps of heating a cis-4-carboalkoxy-5-substituted-oxazolidone (2), wherein the substituent is selected from the group consisting of methyl, phenyl and carboalkoxymethyl radicals, with an equivalent amount of potassium hydroxide in alcoholic solution until the corresponding trans-5-substituted-oxazolidone (2)-4-carboxylic acid is formed and hydrolyzing said trans-oxazolidone (2) derivative to form the threo-β-hydroxy-α-amino acid.

References Cited in the file of this patent

Gilman, "Organic Chemistry," vol. II, pages 872–4 (1938).
Fieser et al., "Organic Chemistry," pages 272–3 (1950).
Elderfield, "Heterocyclic Compounds," vol. 5, page 396 (1957).